United States Patent
Ohtani et al.

(10) Patent No.: US 7,325,432 B2
(45) Date of Patent: Feb. 5, 2008

(54) METHOD FOR MANUFACTURING FUEL CELL METALLIC SEPARATOR

(75) Inventors: Teruyuki Ohtani, Saitama (JP); Makoto Tsuji, Saitama (JP); Masao Utsunomiya, Saitama (JP); Koji Kotani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 572 days.

(21) Appl. No.: 10/309,320

(22) Filed: Dec. 4, 2002

(65) Prior Publication Data
US 2003/0162077 A1    Aug. 28, 2003

(30) Foreign Application Priority Data

| Dec. 5, 2001 | (JP) | P. 2001-371331 |
| Feb. 1, 2002 | (JP) | P. 2002-025476 |
| Mar. 15, 2002 | (JP) | P. 2002-072794 |
| Mar. 15, 2002 | (JP) | P. 2002-072804 |

(51) Int. Cl.
  *H01M 8/02* (2006.01)
(52) U.S. Cl. .................. 72/340; 29/623.1
(58) Field of Classification Search ............ 72/340; 29/623.1; 451/38
See application file for complete search history.

(56) References Cited

U.S. PATENT DOCUMENTS

| 4,443,918 | A * | 4/1984 | Morinari et al. ......... 29/2 |
| 6,379,476 | B1 * | 4/2002 | Tarutani et al. ......... 148/325 |
| 6,383,678 | B1 * | 5/2002 | Kaneko et al. ......... 429/34 |
| 6,524,681 | B1 * | 2/2003 | Seitz et al. .......... 428/143 |
| 6,607,857 | B2 * | 8/2003 | Blunk et al. .......... 429/34 |
| 6,699,593 | B2 * | 3/2004 | Kaneta et al. ......... 428/670 |
| 6,805,989 | B2 * | 10/2004 | Seido et al. .......... 429/34 |
| 6,835,488 | B2 * | 12/2004 | Sasahara et al. ....... 429/39 |

FOREIGN PATENT DOCUMENTS

| DE | 689 21 601 T2 | 7/1995 |
| EP | 0 933 825 A2 | 8/1999 |
| EP | 1 046 723 A1 | 10/2000 |
| JP | 2000-138065 | * 5/2000 |
| JP | 2000-215902 | 8/2000 |
| JP | 2000-317531 | 11/2000 |
| WO | 01/05571 A1 | 1/2001 |

* cited by examiner

*Primary Examiner*—Daniel C Crane
(74) *Attorney, Agent, or Firm*—Arent Fox LLP (57) ABSTRACT

A metallic separator according to a first embodiment is formed by obtaining a blank by rolling a metallic material having conductive inclusions, and removing a surface of the blank by 2% or more of the thickness of the blank. A metallic separator according to a second embodiment is formed by pressing a metallic plate so as to have a cross section including ridges and grooves alternatively, and removing parts of the ridged portions so as to make flattened surfaces. A metallic separator having conductive inclusions in its metal texture according to a third embodiment is formed by blasting a liquid containing two or more kinds of abrasives having different particle diameters to a blank after it has been rolled. A metallic separator having conductive inclusion in its metal texture according to a fourth embodiment is formed by blasting a passivation treatment liquid mixed with abrasives to the separator.

6 Claims, 8 Drawing Sheets

METHOD FOR MANUFACTURING FUEL CELL METALLIC SEPARATOR

BACKGROUND OF THE INVENTION

1. Field of the Invention

The present invention relates to a metallic separator which is installed in a proton-exchange membrane fuel cell and a method for manufacturing the same metallic separator.

2. Description of the Related Art

In a proton-exchange membrane fuel cell, a laminated body in which separators are laminated on both sides of a flat plate-like membrane electrode assembly (MEA) is made to be one unit, and a plurality of units are stacked together to form a fuel cell stack. The membrane electrode assembly is of a three-layer construction in which an electrolytic membrane comprising an ion-exchanging resin as held between a pair of gas diffusion electrodes which constitute a positive pole (cathode) and a negative pole (anode). The gas diffusion electrode is such that a gas diffusion layer is formed on the outside of an electrode catalyst layer which contacts the electrolytic membrane. In addition, the separator is laminated in such a manner as to be brought into contact with the gas diffusion electrode of the membrane electrode assembly, whereby a gas flow path through which gas is allowed to flow and a coolant flow path are formed between the separator so laminated and the gas diffusion electrode. According to the fuel cell, for example, when hydrogen gas which is fuel is allowed to flow through a gas flow path which faces the gas diffusion electrode on the negative pole side, whereas oxide gas such as oxygen or air is allowed to flow trough a gas flow path which faces the gas diffusion electrode on the positive pole side, an electrochemical reaction occurs and current is generated.

The separators need to have a function to supply electrons generated through a catalytic reaction of hydrogen gas on the negative pole side to an outside circuit, as well as a function to supply electrons from the outside circuit to the positive pole side. To this end, conductive materials, such as graphite and metallic materials, are used for the separators. In particular, the metallic materials are considered to be advantageous in that they have superior mechanical strength and that they can be formed into a thin plate which can eventually provide a separator light in weight and small in size. As the metallic separator, there is a separator which is manufactured by rolling stainless steel containing conductive inclusions which are deposited and/or dispersed therein into a thin plate, and forming by pressing the thin plate so as to have a cross section constituted by alternate ridges and grooves so that the grooves formed on front and back surfaces of the thin plate are used for the gas flow paths and coolant flow paths. The conductive inclusions are such as to contribute to the improvement in power generating performance by forming a conductive path.

With the metallic separators so constructed, the ridges surfaces are brought into contact with gas diffusion electrodes of the membrane electrode assembly in a state in which the separators are assembled to the membrane electrode assembly. The ridged portions are formed into a trapezoid having sides which are slightly inclined so that the separator can easily be removed from the die after pressing. In addition, corners which are transitional portions from the surface of the ridged portion to the sides are inevitably formed into a round shape (R-shape) by bending. These constitute restrictions on the enlargement of actual contact areas to the membrane electrode assembly at the surfaces of the ridged portions. A reduction in contact area of the separator to the membrane electrode assembly leads to an increase in contact resistance and prevents the improvement of power generating performance. Therefore, the enlargement of the contact area is desired. In addition, some of separator, the surfaces of the ridged portions are each close to the round shape as a whole and hence their flattened surfaces become limited. As this occurs, it is difficult to ensure that a desired surface pressure is obtained at the surfaces the ridged portions which are in contact with the membrane electrode assembly, this also leading to an increase in contact resistance.

Further, when stainless steel in which conductive inclusions are deposited and/or dispersed is rolled into a thin plate, there may be caused a case where an abnormal layer is produced on the surface of the thin plate in which conductive inclusions which are broken extremely finely by rolling are caused to aggregate. In case a fuel cell is constituted by separators in which the abnormal layers exist on the surfaces thereof and is then put in operation, the conductive inclusions existing in the abnormal layers drop, which leads to deterioration in power generating performance.

Moreover, in the manufacture of separators as has been described above, since there exists a surface rolling-affected layer on a stainless steel plate, the steps are required of grinding to remove the surface rolling-affected layer so as to allow good conductive inclusions that have not been affected by rolling to be exposed on the surface of a base metal and, furthermore, allowing the exposed conductive inclusions to protrude so as to reduce the contact resistance. However, there has existed a problem that a naturally oxidized film is formed on the surface of the base metal between the step of grinding and removing the surface rolling-affected layer and the step of allowing the conductive inclusions to protrude. Once a naturally oxidized film is formed on the surface of the base metal, even if the step of allowing the conductive inclusions to protrude is implemented thereafter, the effect on the improvement in conductivity by the step of allowing the conductive inclusion to protrude cannot be obtained sufficiently due to the existence of the naturally oxidized film. Owing to this, in order to obtain sufficient conductivity, a complicated step must be implemented further, leading to another problem that the production costs are increased.

Further, after the process of grinding to remove the surface rolling-affected layers so that the conductive inclusions are allowed to protrude in the vicinity of the surfaces of the stainless steel plate to thereby reduce the contact resistance, a process is conducted of applying to newly produced surfaces of the stainless steel plate a treatment for providing corrosion resistance thereto. In related art, the passivation treatment has been used for providing the corrosion resistance to the newly produced surfaces. However, there has been existing a problem that a naturally oxidized film is formed on the newly produced surface during the passivation treatment. The naturally oxidized film is inferior to a film in a passive state in corrosion resistance, and therefore, a further provision of corrosion resistance has been required. However, even if the passivation treatment is implemented after a naturally oxidized film has been formed, the naturally oxidized film interrupts the passivation of the newly produced surface, and therefore, the corrosion resistance improvement effect by the passivation treatment cannot be attained sufficiently. Due to this, in order to obtain a sufficient corrosion resistance, a further complicated step has to be implemented, this leading to another problem that the production costs are increased.

SUMMARY OF THE INVENTION

A first object of the present invention is to provide a fuel cell metallic separator formed by pressing so as to have a cross section constituted by alternate ridges and grooves wherein contact areas of surfaces of ridged portions to a membrane electrode are enlarged to secure a desired surface pressure, whereby the contact resistance is reduced to thereby improve the power generating performance and a method for manufacturing the same separator.

A second object of the present invention is to provide a fuel cell metallic separator manufactured by rolling a metallic material having conductive inclusions, wherein the fuel cell metallic separator is not affected by abnormal layers of conductive inclusions produced on the surfaces thereof by rolling, whereby its power generating performance is attempted to be improved, as a result, and a method for manufacturing the same separator.

A third object of the present invention is to provide a method for manufacturing a fuel cell metallic separator in which grinding a surface rolling-affected layer on a base metal and allowing conductive inclusions to protrude can be implemented in a single step.

A fourth object of the present invention is to provide a method for manufacturing a fuel cell metallic separator in which a passivation treatment can be applied to newly produced surfaces obtained by grinding on a base metal at the same time as the grinding to remove surface rolling-affected layers.

In order to accomplish the first object above, the following means are adopted. According to a first aspect of the present invention, there is provided a fuel cell metallic separator comprising:

a metallic plate having alternatively ridges and grooves in a cross section which are formed by pressing, each of the ridge portions having a flattened surface which is brought into contact with a membrane electrode assembly, the flattened surface being formed by removing a part of the ridged portion after pressing.

In the fuel cell metallic separator, it is preferable that a removed amount of the surface of the ridged portion is 3 μm or larger.

Further, according to a second aspect of the present invention, there is also provided a method for manufacturing a fuel cell metallic separator comprising:

forming a metallic plate having alternatively ridges and grooves in a cross section, by pressing, and; removing a part of each of the ridged portions so that each of the ridge portions has a flattened surface. In this method, it is preferable that a removed amount of the surface of the ridged portion is equal to or larger than 3 μm. As a method for removing the surface of the ridged portion, there are an electrochemical method such as electrolytic etching, a chemical method such as etching and a physical method such as cutting or sandblasting.

Further, the inventor came to know that the thickness of the abnormal layer produced on the surfaces of the separator by rolling is something like in the order of 2% of the total thickness, and therefore the present invention was eventually completed based on this knowledge. Namely, in order to accomplish the second object above, according to a third aspect of the present invention, there is provided a fuel cell metallic separator formed by rolling a metallic material having conductive inclusions and removing a surface of the metallic material after rolling by an amount corresponding to 2% or more of a thickness of the metallic material after rolling so that the conductive inclusions are allowed to protrude from the surface of the metallic material after rolling.

According to the fuel cell metallic separator of the third aspect of the present invention, since the surfaces of the separator are removed by 2% or more of the thickness of the metallic material after the material has been rolled, abnormal layers produced on the surfaces of the metallic material by rolling are removed. Therefore, the surfaces of the metallic material are made good and the conductive inclusions are allowed to protrude therefrom. Due to this, when the metallic separators so manufactured are incorporated in a fuel cell, the contact resistance relative to a membrane electrode assembly is reduced to thereby improve its power generating performance.

Further, according to a forth aspect of the present invention, there is also provided a method for manufacturing fuel cell metallic separator comprising:

obtaining a blank by rolling a metallic material having conductive inclusions, and;

removing a surface of the blank by an amount corresponding to 2% or more of a thickness of the blank so that the conductive inclusions are allowed to protrude from the surface of the blank. As a method for removing the surfaces, there are an electrochemical method such as electrolytic etching, a chemical method such as etching and a physical method such as cutting or sandblasting.

In addition, in a case where the blank is formed into a final separator shape by pressing the blank in such a manner as to form alternate ridges and grooves on the blank, the surface removing step may be implemented either before or after the blank is pressed. For the separator so pressed, since surfaces of ridged portions constitute contact portions to the membrane electrode assembly, the present invention may be limited such that the surface removing process according to the present invention is applied only to the surfaces of the ridged portions. Furthermore, in order to improve the corrosion resistance, a passivation treatment may finally be applied to the surfaces of the separator.

In order to accomplish the third object above, according to a fifth aspect of the present invention, there is provided a method for manufacturing a fuel cell metallic separator having conductive inclusions in its metallic texture, comprising:

blasting a liquid containing two or more kinds of abrasives having different particle diameters to a blank that has been rolled.

There exists, in its metal texture of a blank for a metallic separator, conductive inclusions having a hardness higher than that of a base metal. Therefore, normally, a method for manufacturing a fuel cell metallic separator requires steps of grinding the surface of the base metal for removing the conductive inclusions as well as the parent phase and grinding only the surface of the base metal so as to allow the conductive inclusions to protrude. A wet-blasting method is used as one of common means used in these steps. In general, this is a method for blasting a liquid containing a single kind of abrasives from a slit-like injection port to a body to be ground. In the step of grinding to remove the surface of the base metal, abrasives having a large particle diameter are used which can produce kinetic energy which is large enough in magnitude to grind conductive inclusions as well as the parent phase. In contrast, in the step of allowing the conductive inclusions to protrude, abrasives having a small particle diameter are used which can produce kinetic energy which is small but large enough in magnitude to grind only the surface of the base metal.

On the contrary to this, the method for manufacturing a fuel cell metallic separator according to the present invention uses a specific wet blasting method for blasting a liquid containing two or more kinds of abrasives having different particle diameters to a separator. Consequently, according to the present invention, not only the parent phase but also the conductive inclusions are ground to be removed by the abrasives having a large particle diameter, and at the same time as this occurs, only the surface of the base metal is ground by the abrasives having a small particle diameter. Therefore, allowing the conductive inclusions to protrude as well as grinding and removing the surface of the base metal can be implemented in a single step, whereby the formation of a naturally oxidized film on the surface of the base metal can be prevented and a superior conductivity improving effect can be obtained. In addition, according to the present invention, since the related-art complicated steps are no more required, there can be provided an advantage that the production costs can be reduced to a lower level. Furthermore, in the fuel cell using the separators, a superior power generating voltage can be exhibited.

In addition, the step of blasting the liquid containing two or more kinds of abrasives having different particle diameters may be carried out after the separator blank has been pressed or before the pressing is completed. Furthermore, in the manufacturing method according to the present invention, a passivation treatment is preferably applied to the surface of the separator blank, and this passivation treatment applying step may be implemented in any step after the wet-blasting step has been completed. In addition, any passivation treatment liquid may be used provided that the liquid can form a passive-state film on the surface of the base metal of the separator.

Further, in order to accomplish the fourth object above, according to the sixth aspect of the present invention, there is provided a method for manufacturing a fuel cell metallic separator having conductive inclusions in its metal texture, the method comprising: blasting a passivation treatment liquid mixed with abrasives to the separator.

As a common method for grinding a fuel cell metallic separator using a wet-blasting process, there is a method in which a separator body to be ground is ground by blasting water mixed with abrasives to the separator body from a slit-like injection port. On the other hand, in the method for manufacturing a fuel cell metallic separator according to the present invention, a unique wet-blasting process is used in which a passivation treatment liquid mixed with abrasives is blasted to the separator. According to this method, the surface rolling-affected layers of the separator be ground can be removed by blasting the abrasives to the separator surfaces so that the conductive inclusions can be exposed. Further, at the same time as this grinding process takes place, a passivation treatment can be applied to newly produced surfaces of the separator which results from the grinding by blasting the passivation treatment liquid.

There is no limitation on the passivation treatment liquid that is used in the method for manufacturing a fuel cell metallic separator according to the present invention provided that a film in a passive state can be formed on the surface of the base metal of the separator. In the present invention, however, the passivation treatment liquid is preferably nitride acid. In addition, the process of blasting the passivation treatment liquid mixed with the abrasives of the present invention may be implemented after the separator blank has been pressed or before the pressing.

DETAILED DESCRIPTION OF THE INVENTION

Figure 1:
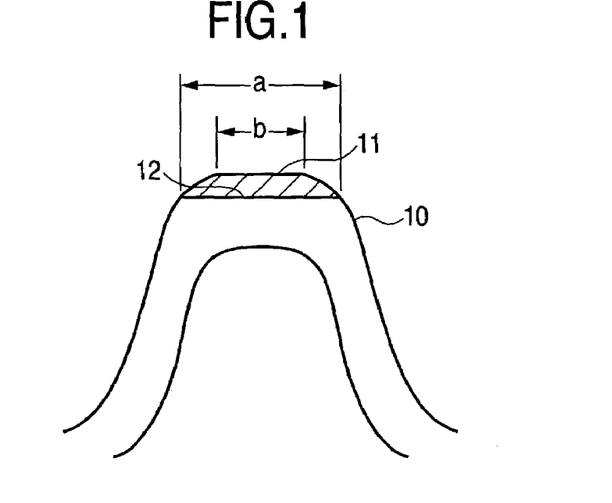
FIG. 1 is a diagram showing the concept of a separator according to the present invention.

FIG. 1 illustrates the concept of a separator according to a first embodiment of the present invention, in which a surface 11 of a ridged portion 10 is removed and a flattened surface 12 is newly formed. In FIG. 1, a shaded portion denotes a portion that is removed, and a range indicated by "a" or the surface 12 constitutes a contact surface which is brought into contact with a membrane electrode assembly. Incidentally, "b" denotes a contact area to the membrane electrode assembly in a state in which the surface 11 is not removed or of the related-art ridged portion 10.

As is clear in FIG. 1, the contact surface is enlarged by removing the surface of the ridge portion, and due to this, a desired surface pressure relative to the membrane electrode assembly is ensured, and the contact resistance is reduced to thereby improve the power generating performance. In a state in which the surface of the ridge portion is removed, in case the round shape of the corner portions generated by pressing is removed, the contact area is enlarged further, which is preferable. Stainless steel is preferably used for the separator according to the present invention. Since stainless steel in which nonmetal conductive inclusions which constitute a conductive path are dispersed into the metallic texture exhibits good conductivity, it is especially preferable as a material for fuel cell separators. With such stainless steel being applied to the present invention, the conductive inclusions are allowed to protrude from the surface when the surface of the ridge portion is removed, whereby the improvement in function as the separator can be attempted. In case an amount of the surface that is removed after pressing lowers below 3 μm, the effect of reducing the contact resistance relative to the membrane electrode assembly cannot be obtained largely, and therefore, the removal amount is preferably equal to or larger than 3 μm.

EXAMPLES

Next, examples of the present invention will be described.

A. Manufacture of Separator

Examples 1 to 10

Figure 2:
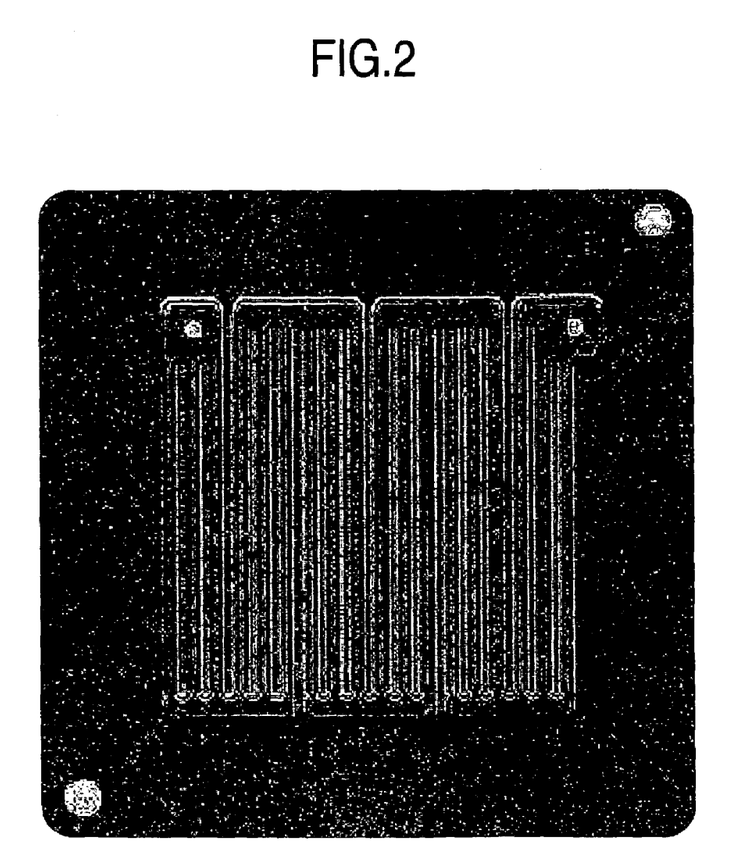
FIG. 2 is an image of a separator that represents separators manufactured in examples of the present invention.
Figure 3:
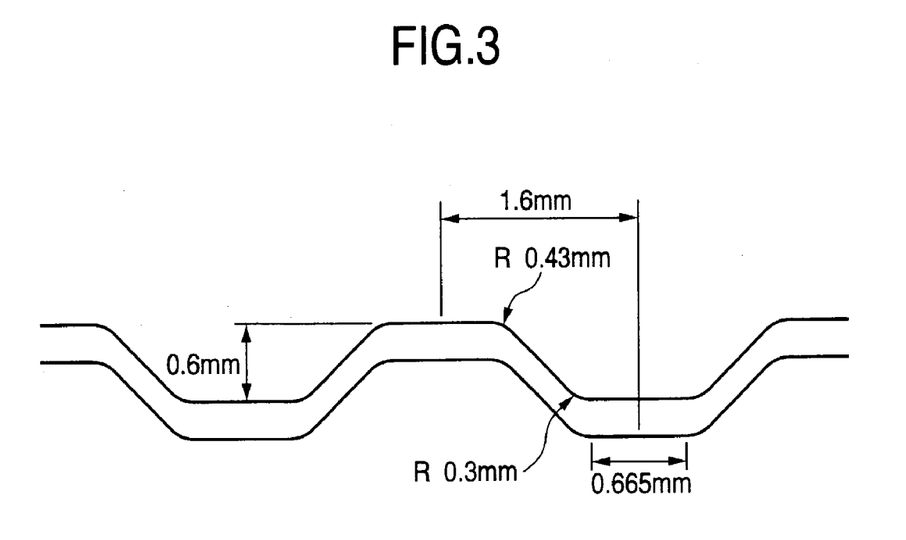
FIG. 3 is a sectional view of a current collecting portion (a portion where alternate ridges and grooves are formed) of the separators manufactured in the examples.

An austenite stainless steel plate having a thickness of 0.2 mm was pressed to obtain a required number of square separator blanks of 92 mm wide and 92 mm long. FIG. 2 shows these separator blanks each have a current collecting portion having a cross section formed to have alternate ridges and grooves at the center thereof and a flat edge portion around the periphery of the current collecting portion. FIG. 3 illustrates part of the cross section and dimensions of the current collecting portion of the separator blank. Next, masking was applied to interior surfaces of the grooves on both sides of the separator blank, and only surfaces of ridged portions on the sides of the separator blank were removed by electrolytic etching to thereby flatten the surfaces. As shown in Table 1, amounts (thicknesses) of the surfaces that were removed were 1 μm, 2 μm, 3 μm, 4 μm, 5 μm, 6 μm, 7 μm, 10 μm, 20 μm and 50 μm, whereby 10 kinds of separators which differ in removed amount were manufactured and they are represented by Examples 1 to 10, respectively. Note that an adhesive tape produced by Fleon Industries Co., Ltd. under the trade name of F-7034 (0.8 mm thick) was used as a masking material. In addition, a phosphoric acid electrolytic etching liquid produced by Jusco Co., Ltd. under the trade name of 6C016 was used. Then electrolytic etching was carried out in the following conditions; temperature was 50 degrees centigrade and current density was 0.125 A/cm.

Comparison Example

The separator blank in which the surfaces of the ridged portions are not removed was made a separator of comparison example.

TABLE 1

| | Removed Amounts (μm) | Contact Resistance to MEA (mΩ/cm²) |
|---|---|---|
| Comparison Example | 0 | 68 |
| Example 1 | 1 | 30 |
| Example 2 | 2 | 27 |
| Example 3 | 3 | 16 |
| Example 4 | 4 | 17 |
| Example 5 | 5 | 16 |
| Example 6 | 6 | 15 |
| Example 7 | 7 | 15 |
| Example 8 | 10 | 14 |
| Example 9 | 20 | 14 |
| Example 10 | 50 | 14 |

B. Measuring Contact Resistances

Next, fuel cell units were manufactured using the separators of Examples 1 to 10 and the comparison example, respectively, in which the separators of each example were laminated on sides of a membrane electrode assembly as an unit, and the units for each example were activated to generate power to measure contact resistances of the separators of those examples relative to the membrane electrode assemblies. The results of the measurement were also shown in Table 1, and the relationship between the removed amount of the surface of the ridged portion and contact resistance are graphed in FIG. 4.

Figure 4:
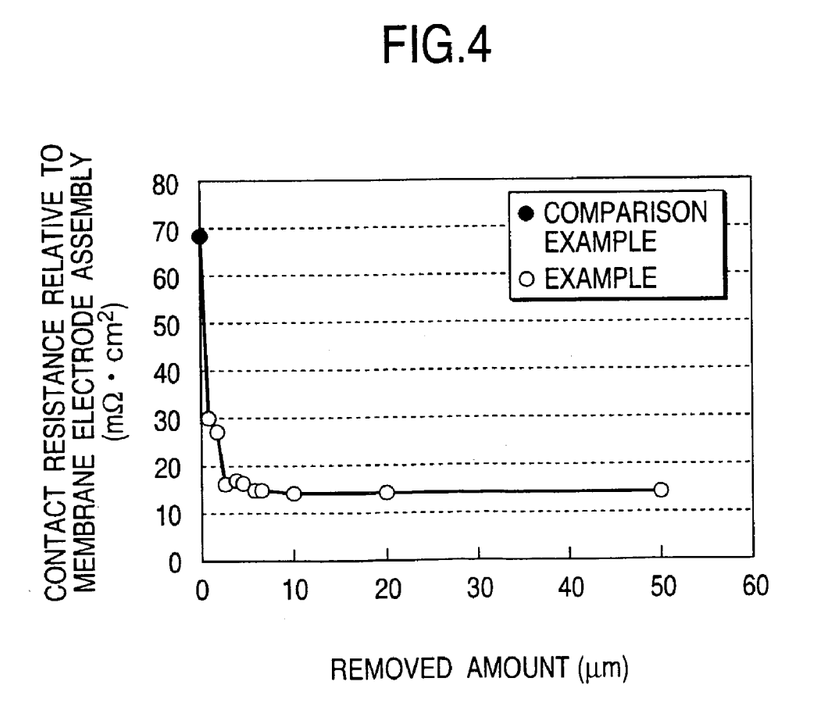
FIG. 4 is a graph showing the results of contact resistances measured in the examples.

As is clear from FIG. 4, it was verified that the contact resistances of the separators of Examples 1 to 10 are far lower than that of the separator of the comparison example and that flattening the surface of the ridged portion by removing part thereof contributed to the improvement of the power generating performance. In particular, the contact resistance reduced remarkably with the removed amount of the surface of the ridged portion being 3 μm. Then, it was confirmed that same reduction effect was expected by a further increase in removed amount.

Next, the metallic separator according to a second embodiment of the present invention will be explained. An austenite stainless steel plate having conductive inclusions is raised as a material for the separator according to the second embodiment of the present invention. Specifically speaking, an austenite stainless steel plate is used which contains respective components shown in Table 2 and in the remaining portion thereof Fe, B and unavoidable impurities and in which Cr, Mo and B satisfy the following expression (1). B is deposited on the surface as a boride of M B or MB type and a boride of $M_{23}(C, B)_6$ type, and these borides are conductive inclusions which form a conductive path on the surface of the separator.

$$Cr(wt\ \%)+3\times Mo(wt\ \%)-2.5\times B(wt\ \%)\geq 17 \quad (1)$$

TABLE 2

| C | Si | Mn | P | S | Al |
|---|---|---|---|---|---|
| ≦0.15 | 0.01~1.5 | 0.01~0.5 | ≦0.035 | ≦0.01 | 0.001~0.2 |
| N | Cu | Ni | Cr | Mo | |
| ≦0.3 | 0~3 | 7~50 | 17~30 | 0~7 | |

(percent by weight)

EXAMPLES

Next, examples of the present invention will be described.

A. Manufacture of Blank

A thin plate having a thickness of 0.2 mm was obtained by cold rolling a stainless steel containing respective components shown in Table 3, as well as Fe and unavoidable impurities in the remaining portion thereof with an annealing process being suitably carried out during pressing. Next, a required number of square blanks of 100 mm wide and 100 mm long were obtained by cutting them out of the thin plate so obtained.

TABLE 3

| C | Si | Mn | P | S | Cu | Ni | Cr |
|---|---|---|---|---|---|---|---|
| 0.073 | 0.28 | 0.13 | 0.015 | 0.001 | 0.11 | 10.1 | 20.9 |
| Mo | Nb | Ti | Al | N | B | | |
| 2.03 | — | — | 0.08 | 0.030 | 0.60 | | |

(percent by weight)

B. Surface Removing Process and Pressing

Example 11

The following wet-blasting process was applied to both surfaces of the blank to thereby remove the surfaces by 4 μm. Alumina particles (produced by Fuji Seisakusho Co., Ltd. under trade name of Fujirandom WA#300) having a particle diameter of 0.3 mm was mixed into water as grinding particles, and this grinding particles mixed water was blasted to the surfaces at a blasting pressure of 1 kg/cm² for 20 seconds. Next, this blank was pressed into a predetermined separator shape to thereby obtain a separator of Example 11.

Example 12

After the blank was pressed into a predetermined separator shape, the same wet-blasting process as that carried out for Example 11 was applied to both surfaces of the blank to thereby obtain a separator of Example 12 in which the surfaces were removed by 4 μm.

Example 13

The following chemical etching (nitro-hydrofluoric acid etching) process was applied to the surfaces of the blank to thereby remove the surfaces by 5 μm. An etching liquid containing 20% of nitride acid and 8% of hydrofluoric acid was held at 30 degrees centigrade and was jet stirred, and the blank was submerged in this etching bath for 30 minutes. Next, the blank was then pressed into a predetermined separator shape to thereby obtain a separator of Example 13.

Example 14

After the blank was pressed into a predetermined separator shape, the same chemical etching as that carried out for Example 13 was applied to both surfaces of the blank so as to remove the surfaces by 5 μm to thereby obtain a separator of Example 14.

Example 15

The following sand blasting process was applied to both surfaces of the blank so as to remove the surfaces by 10 μm. The alumina particles used for Example 11 were also used as grinding particles, and the alumina particles in a dried state were blasted at a blasting pressure of 2 kg/cm² for 10 seconds. Next, the blank so sand-blasted was then pressed into a predetermined separator shape to thereby obtain a separator of Example 15.

Example 16

After the blank was pressed into a predetermined separator shape, the same sand blasting process as that carried out for Example 15 was applied to both surface of the blank so as to remove the surfaces by 10 μm to thereby obtain a separator of Example 16.

Comparison Example 11

The blank was only pressed into a predetermined separator shape and no surface removing process was carried out, the blank being made to be a separator of Comparison Example 11.

Comparison Example 12

A separator of Comparison Example 12 was obtained in the similar manner as Example 11 except that both surfaces were removed by 1.5 μm in amount.

Comparison Example 13

A separator of Comparison Example 13 was obtained in the similar manner as Example 12 except that both surfaces were removed by 1.5 μm in amount.

Comparison Example 14

A separator of Comparison Example 14 was obtained in the similar manner as Example 11 except that both surfaces were removed by 2.5 μm in amount.

Comparison Example 15

A separator of Comparison Example 15 was obtained in the similar manner as Example 12 except that both surfaces were removed by 2.5 μm in amount.

Figure 5:
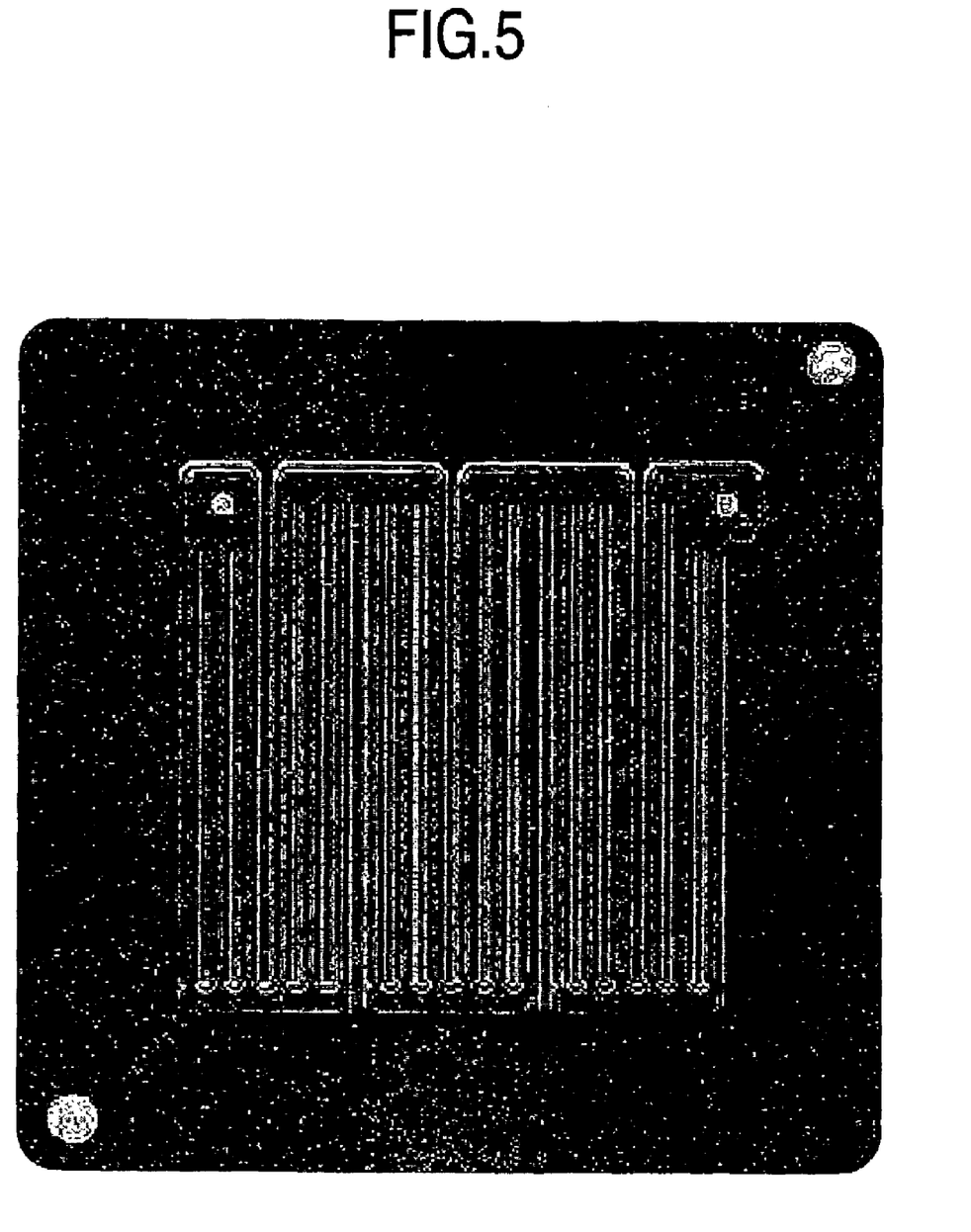
FIG. 5 is an image of a separator that is to be manufactured in examples of the present invention.

Note that FIG. 5 shows a pressed separator which is something like those obtained in the examples of the present invention and the comparison examples, and this separator has at the center thereof a current collecting portion which is pressed so as to have a cross section constituted by alternate ridges and grooves and a flat edge portion around the periphery of the current collecting portion.

C. Observation of Surfaces

Figure 6:
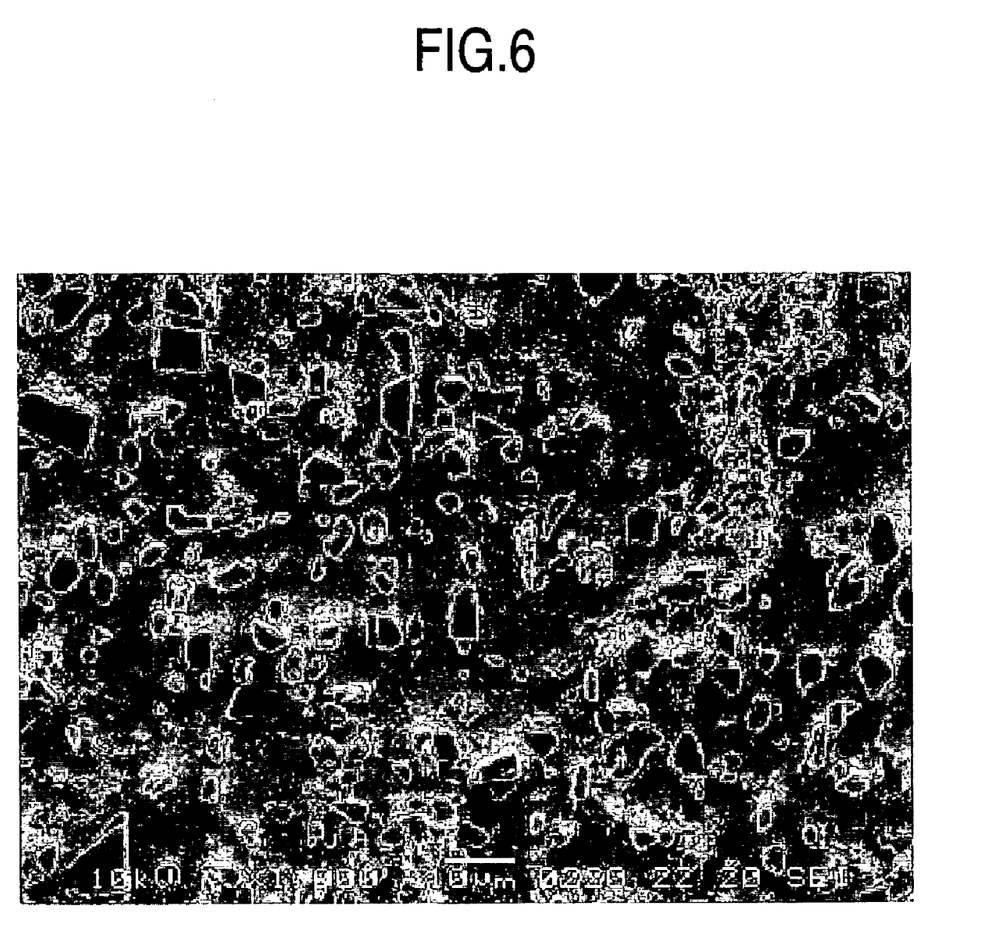
FIG. 6 is an image of the surface of the separators of the examples of the present invention.
Figure 7:
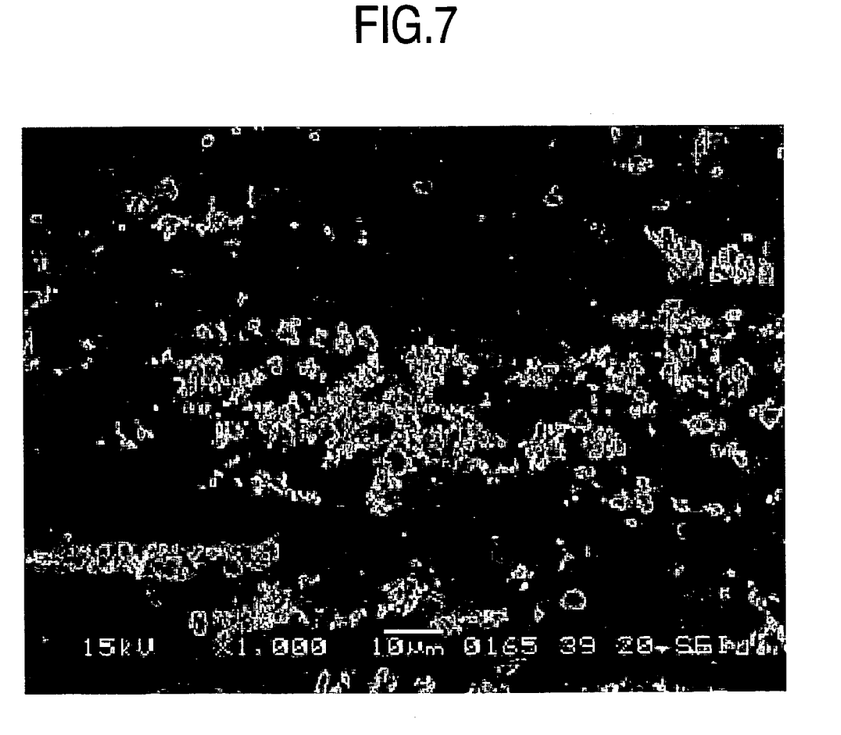
FIG. 7 is an image of the surface of separators of Comparison Examples which correspond to those of the invention.

The surfaces of the separators of Example 11 and Comparison Example 11 were observed by a microscope. FIG. 6 is an image of the surface of the separator of Example 11. FIG. 7 is an image of the surface of the separator of Comparison Example 11. It is observed that unbroken good conductive inclusions having a particle diameter of in the order of 5 μm were allowed to protrude from the surface of the separator of Example 11. On the other hand, it is observed that finely broken conductive inclusions aggregated on the surface of the separator of Comparison Example 11.

D. Measurement of Power Generating Voltage

Using the respective separators of Examples 11 to 16 and Comparison Example 11 to 15, respectively, fuel cell units were manufactured in which the separators were laminated to both sides of a membrane electrode assembly (MEA), and the fuel cell units so manufactured were then activated to generate power to measure power generating voltages when a current of 0.5 A/cm2 was generated at such timings at an initial point in time (0 hour) and points in time; 10 hours has elapsed, 100 hours has elapsed, 2000 hours has elapsed and 3000 hours has elapsed, respectively. The results were shown in Tables 4A and 4B together with manufacture processes (order of surface removing process and pressing) and surface removed amounts.

TABLE 4A

| | Manufacture Processes | Surface Removed Amounts (μm) |
|---|---|---|
| Example 11 | wet-blasting → pressing | 4 |
| Example 12 | pressing → wet-blasting | 4 |
| Example 13 | nitro-hydrofluoric acid etching → pressing | 5 |
| Example 14 | pressing → nitro-hydrofluoric acid etching | 5 |
| Example 15 | sand blasting → pressing | 10 |
| Example 16 | pressing → sand blasting | 10 |
| Comparison Example 11 | pressing only | 0 |

TABLE 4A-continued

| | Manufacture Processes | Surface Removed Amounts (μm) |
|---|---|---|
| Comparison Example 12 | wet-blasting → pressing | 1.5 |
| Comparison Example 13 | pressing → wet-blasting | 1.5 |
| Comparison Example 14 | wet-blasting → pressing | 2.5 |
| Comparison Example 15 | pressing → wet-blasting | 2.5 |

TABLE 4B

| | Power Generating Voltage (V) when a current of 0.5 A/cm$^2$ is generated | | | | | |
|---|---|---|---|---|---|---|
| | 0 hour | 10 hours | 100 hours | 1000 hours | 2000 hours | 3000 hours |
| Example 11 | 0.7 | 0.7 | 0.7 | 0.7 | 0.7 | 0.7 |
| Example 12 | 0.7 | 0.7 | 0.7 | 0.7 | 0.7 | 0.7 |
| Example 13 | 0.7 | 0.7 | 0.7 | 0.7 | 0.7 | 0.7 |
| Example 14 | 0.7 | 0.7 | 0.7 | 0.7 | 0.7 | 0.7 |
| Example 15 | 0.7 | 0.7 | 0.7 | 0.7 | 0.7 | 0.7 |
| Example 16 | 0.7 | 0.7 | 0.7 | 0.7 | 0.7 | 0.7 |
| Comparison Example 11 | 0.7 | 0.65 | 0.63 | 0.55 | 0.43 | 0.24 |
| Comparison Example 12 | 0.7 | 0.69 | 0.66 | 0.63 | 0.59 | 0.55 |
| Comparison Example 13 | 0.7 | 0.68 | 0.66 | 0.64 | 0.59 | 0.55 |
| Comparison Example 14 | 0.7 | 0.69 | 0.68 | 0.66 | 0.65 | 0.63 |
| Comparison Example 15 | 0.7 | 0.68 | 0.66 | 0.65 | 0.64 | 0.61 |

As is clear from Table 2, with the separators of the examples of the present invention, a power generating voltage at the initial point in time was still maintained even at the point in time when 3000 hours had elapsed, whereas with the separators of Comparison Examples, it is observed that the initial power generating voltage was reduced with time, this verifying the effectiveness of the present invention.

E. Effect of Passivation Treatment

Next, the verification was made with respect to the superiority resulting when a passivation treatment was finally applied to the surfaces of the separator.

Example 17

An electrolytic etching process was applied to the surfaces of the blank so as to remove the surfaces by 4 μm. A phosphoric acid electrolytic etching liquid (produced by Jusco Co., Ltd. under the trade name of 6C016) was held at 50 degrees centigrade, a current having a current density of 0.125 A/cm$^2$ was conducted through the etching liquid, and the blank was submerged in the etching bath for 10 minutes. Next, the blank was then pressed into a predetermined separator shape. Finally, the pressed separator was submerged for 10 minutes in a liquid bath containing 50 per cent by weight of nitride acid for passivation treatment of the surfaces to thereby obtain a separator of Example 17.

Comparison Example 16

The same passivation treatment as done for Example 17 was applied to the separator of Comparison Example 11 to thereby obtain a separator of Example 16.

Figure 8:
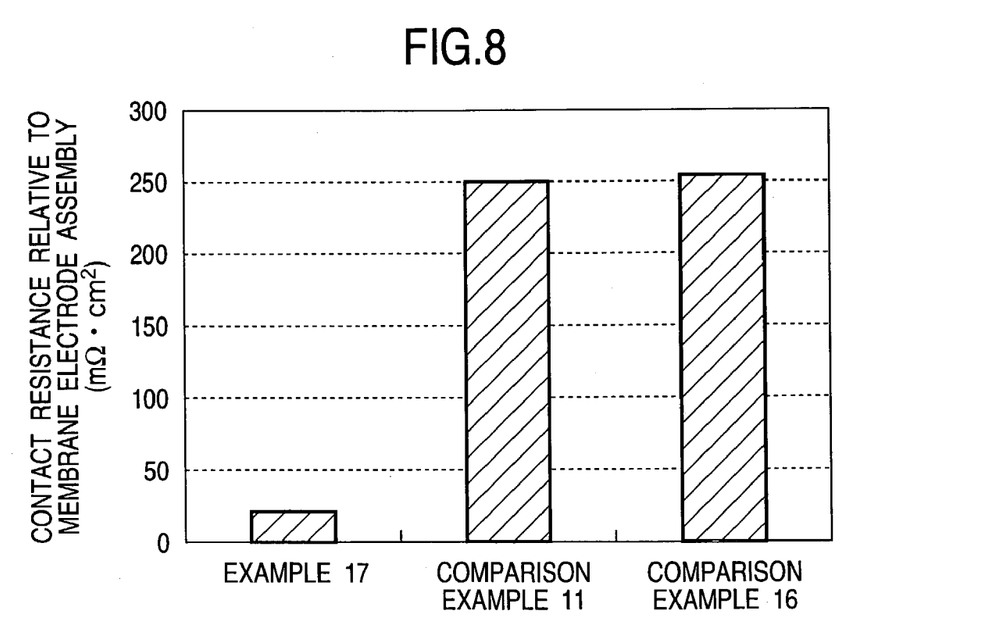
FIG. 8 is a graph showing measured contact resistances of the examples of the present invention.
Figure 9:
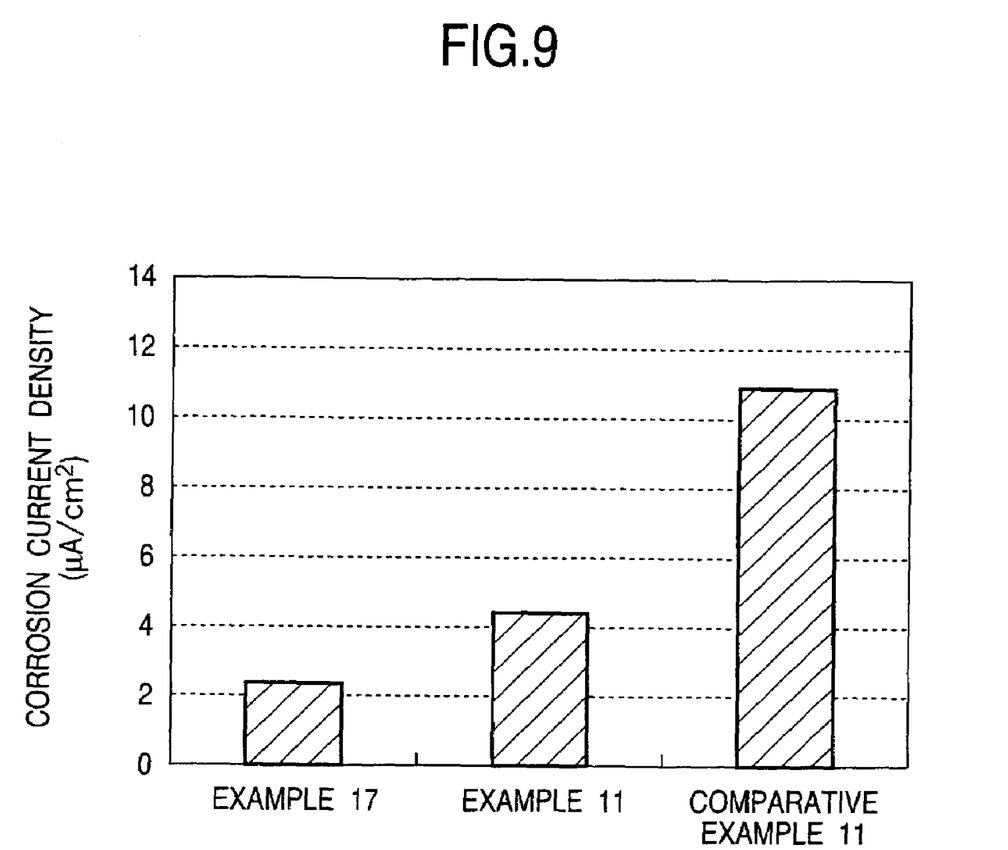
FIG. 9 is a graph showing measured corrosion current densities of the examples of the present invention.

The separators of Example 17, Comparison Example 11 and Comparison Example 16 were brought into contact with membrane electrode assembly, respectively to measure contact resistances of the respective separators. The results of the measurements were shown in FIG. 8. In addition, corrosion current densities of the separators of Example 17, Comparison Example 11 and Comparison Example 16 were measured. The results of the measurements were shown in FIG. 9. As is clear from the results, the separator of Example 17, to the surfaces of which the passivation treatment was applied, showed the lowest values for both contact resistance and corrosion current density. Consequently, it can be expected that a separator to the surfaces of which a passivation treatment is applied exhibits a higher power generating performance.

Next, the metallic separator according to a third embodiment of the present invention will be explained. An austenite stainless steel plate having conductive inclusions is raised as a material for the separator according to the third embodiment of the present invention, as is the case with that of the second embodiment of the present invention. That is, an austenite stainless steel plate is used which contains respective components shown in Table 2 above and in the remaining portion thereof Fe, B and unavoidable impurities and in which Cr, Mo and B satisfy the above-mentioned expression (1), B is deposited on the surface as a boride of $M_2B$ or MB type and a boride of $M_{23}(C, B)_6$ type, and these borides are conductive inclusions which form a conductive path on the surface of the separator.

EXAMPLE

Next, the effectiveness of the present invention will be described in detail using an example of the present invention.

A. Manufacture of Separator

EXAMPLE

An austenite stainless steel plate containing respective components shown in Table 5 and in the remaining portion thereof Fe and unavoidable impurities was cut into a square shape which is 100 mm wide and 100 mm long to there by obtain a blank for a separator, Next, tap water mixed with 33.3 per cent by weight of two kinds of alumina particles whose particle diameters are 60 μm and 180 μm, respectively, at a weight ratio of 1 to 1 as grinding particles and held at a temperature of 30 degrees centigrade was sprayed to both sides of the blank from a spray nozzle at a spraying pressure of 1 kg/cm$^2$ for 30 seconds, whereby grinding the parent phase and allowing conductive inclusions to protrude were implemented using the wet-blasting method. Next, the blank was rinsed and after it dried out, the blank was pressed with a press load of 50 tons and a separator according to the example was obtained.

TABLE 5

| C | Si | Mn | P | S | Al | N | Cu |
|---|---|---|---|---|---|---|---|
| 0.073 | 0.28 | 0.13 | 0.015 | 0.001 | 0.08 | 0.03 | 0.11 |
| Ni | | Cr | | Mo | | B | |
| 10.1 | | 20.9 | | 2.03 | | 0.60 | |

(percent by weight)

Comparison Example

Next, tap water mixed with 33.3 per cent by weight of alumina particles whose particle diameters is 180 μm as grinding particles and held at a temperature of 30 degrees centigrade was sprayed to both sides of a separator blank which was similar to one used for the example from a spray nozzle at a spraying pressure of 1 kg/cm² for 30 seconds, whereby grinding by the wet-blasting method was implemented. Next, the blank was rinsed and after it dried out, the blank was pressed with a press load of 50 tons and a separator according to the example was obtained. Next, tap water mixed with 33.3 per cent by weight of alumina particles whose particle diameters is 60 μm as grinding particles and held at a temperature of 30 degrees centigrade was sprayed to the sides of the separator blank from the spray nozzle at the spraying pressure of 1 kg/cm² for 30 seconds, whereby allowing conductive inclusions to protrude was implemented using the wet-blasting method. Thereafter, the blank was rinsed and after it dried out, the blank was pressed with a press load of 50 tons and a separator according to the comparison example was obtained.

B. Deterioration with Age of Power Generating Voltage

Manufactured using the separators of the example of the present invention and the comparison example which were obtained as has been described above were fuel cell units in each of which the separators were laminated on sides of a membrane electrode assemble (MEA), and the units were activated so as to generate power and deteriorations in power generating voltage as the power generating current density increases were measured. The results of the measurement are shown in FIG. 10.

Figure 10:
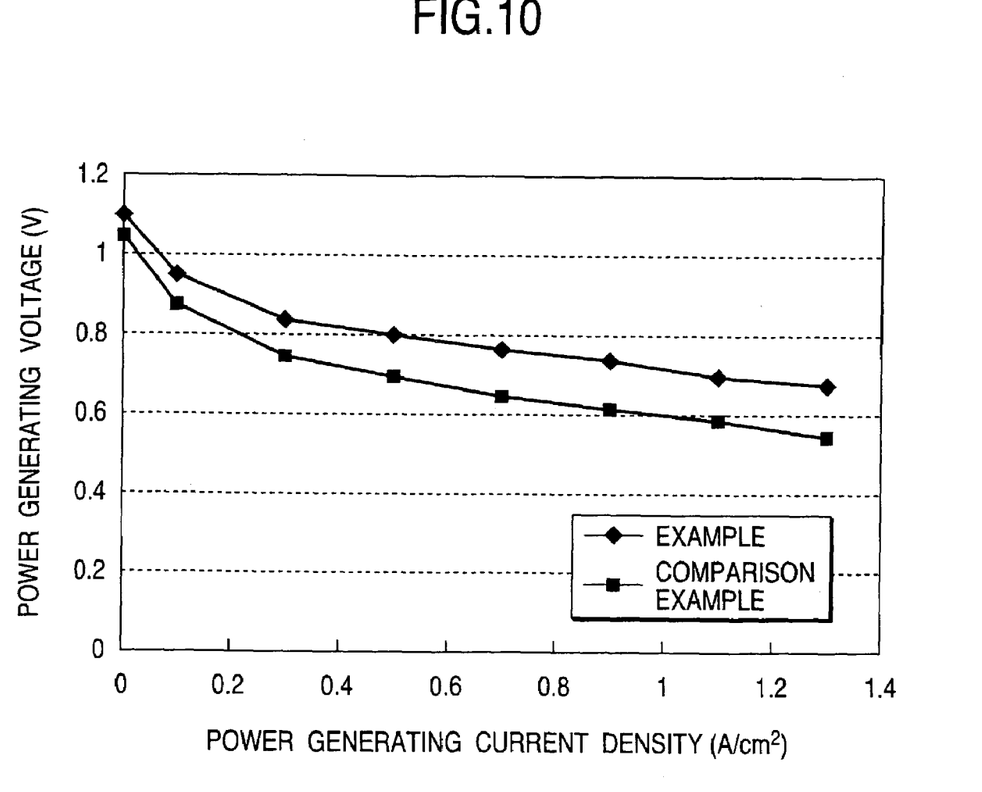
FIG. 10 is a diagram showing a relationship between power generating current density and power generating voltage in a fuel cell using separators according to the present invention and a comparison example.

As is clear from FIG. 10, with the fuel cell unit using the separators of the example of the present invention which was manufactured by implementing the steps of grinding a surface rolling-affected layer and allowing conductive inclusions to protrude at the same time, the deterioration in power generating voltage as the power generating current density increases was extremely low when compared with the fuel cell unit using the separators of the comparison example which was manufactured by implementing the steps of grinding a surface rolling-affected layer and allowing conductive inclusions to protrude sequentially.

Next, the metallic separator according to a fourth embodiment of the present invention will be explained. An austenite stainless steel plate having conductive inclusions is raised as a material for the separator according to the third embodiment of the present invention, as is the case with that of the second embodiment of the present invention. That is, an austenite stainless steel plate is used which contains respective components shown in Table 2 and in the remaining portion thereof Fe, B and unavoidable impurities and in which Cr, Mo and B satisfy the above-mentioned expression (1), B is deposited on the surface as a boride of M B or MB type and a boride of $M_{23}(C, B)_6$ type, and these borides are conductive inclusions which form a conductive path on the surface of the separator.

EXAMPLE

Next, the effectiveness of the present invention will be described in detail using an example of the present invention.

A. Manufacture of Separator

EXAMPLE

An austenite stainless steel plate containing respective components shown in Table 6, as well as Fe and unavoidable impurities in the remaining portion thereof and having a thickness of 0.2 mm was cut into a square separator of 100 mm wide and 100 mm long to thereby obtain a separator blank. Next, 5 per cent by weight of nitride acid mixed with 33.3 per cent by weight of alumina particles having a particle diameter of 60 μm as grinding particles and held at 50 degrees centigrade was blasted to both surfaces of the blank at a blasting pressure of 1 kg/cm² for 30 seconds so that grinding and passivation treatment using the wet-blasting process were thus carried out. Next, after it was rinsed and dried, the blank was pressed with a press load of 50 tons to thereby obtain a separator of an example of the present invention.

TABLE 6

| C | Si | Mn | P | S | Al | N | Cu |
|---|----|----|---|---|----|---|----|
| 0.073 | 0.28 | 0.13 | 0.015 | 0.001 | 0.08 | 0.03 | 0.11 |

| Ni | Cr | Mo | B |
|----|----|----|---|
| 10.1 | 20.9 | 2.03 | 0.60 |

(percent by weight)

Comparison Example

Tap water mixed with 33.3 per cent by weight of alumina particles having a particle diameter of 60 μm as grinding particles and held at 30 degrees centigrade was blasted to both surfaces of the same blank as used for the above example at a blasting pressure of 1 kg/cm² for 30 seconds and grinding using the wet-blasting process was thus carried out. Next, the blank was submerged in 5 per cent by weight of nitride acid which was held at 50 degrees centigrade for 3 minutes and a passivation treatment was thus carried out. Next, after it was rinsed and dried, the blank was pressed with a press load of 50 tons to thereby obtain a separator of a comparison example.

B. Deterioration with Time of Power Generating Voltage

Fuel cell units were manufactured using the separators of the example of the present invention and the comparison example, respectively, which were obtained as has been described above in which the separators are laminated on both sides of a membrane electrode assembly (MEA), and the units were activated to generate power, whereby a deterioration in power generating voltage as power generating time elapses when a current of 0.5 A/cm² was measured for each example. The results of the measurements were shown in FIG. 11.

Figure 11:
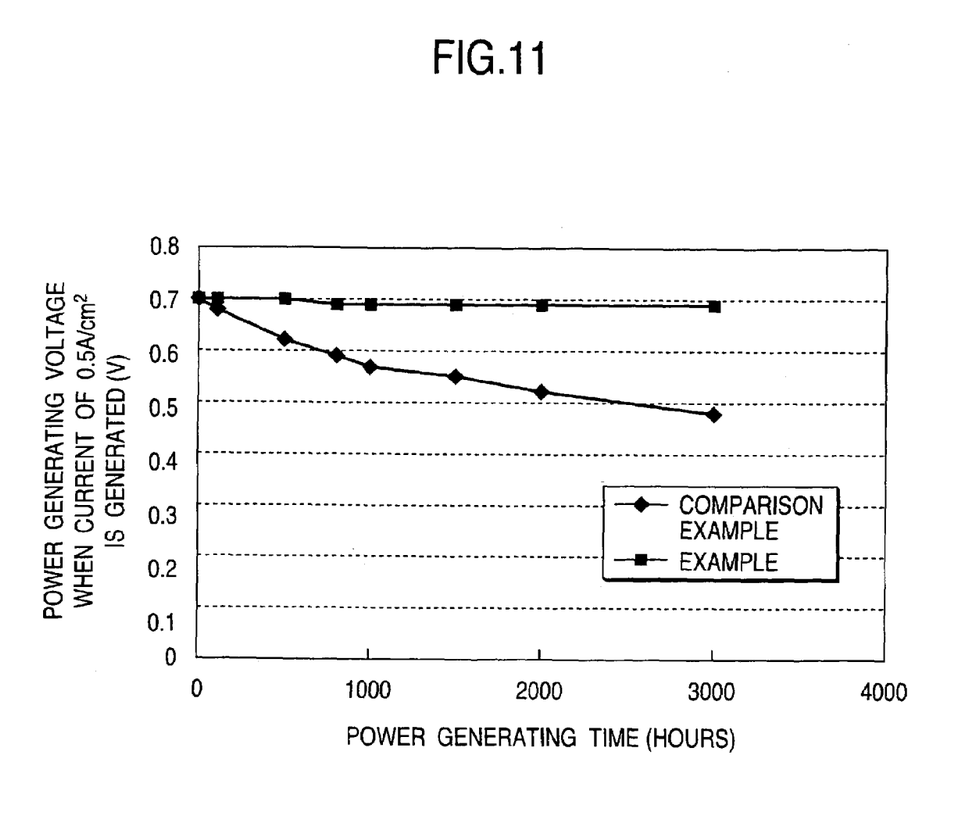
FIG. 11 is a diagram showing the relationship between power generating voltage and power generating time in a fuel cell using the separators of the example of the present invention or the comparison example.

As is clear from FIG. 11, with the fuel cell unit using the separators of the example of the present invention in which no naturally oxidized film but a film in a passive state was formed on the surfaces of the separator and which is superior in corrosion resistance, there was extremely little deterioration in power generating voltage even if power was generated over a long period of time. In contrast, with the fuel cell unit using the separator of the comparison example in which a film in a passive state was formed on the surfaces of the separator via a naturally oxidized film, it was found that the power generating voltage was reduced as the power generating time elapsed.

Thus, as has been described heretofore, according to the present invention, in the fuel cell metallic separator formed by pressing so as to have a cross section constituted by alternate ridges and grooves, the contact area at the surface of the ridged portion is enlarged by removing the surface of the ridged portion that is brought into contact with the membrane electrode assembly after pressing so as to make the flattened surface. Therefore, the desired surface pressure can be ensured, whereby the contact resistance relative to the membrane electrode assembly is reduced, and as a result, there can be provided an advantage that the power generating performance is improved.

As has been described heretofore, according to the present invention, the abnormal layers produced on the surfaces of the metallic material when it is rolled are removed by removing the surfaces of the metallic material by 2% or more of the thickness of the metallic material after the material has been rolled, and the resulting surfaces become good and the conductive inclusions are allowed to protrude therefrom. Thus, there can be provided an advantage that the contact resistance relative to the entirety of the membrane electrode assembly is reduced, whereby the improvement in power generating performance can be attempted.

As has been described above, according to the present invention, since grinding the surface rolling-affected layer of a base metal and allowing conductive inclusions to protrude can be implemented simultaneously by using the unique wet-blasting method in which the liquid containing two or more kinds of abrasive shaving different particle diameters is blasted to a blank after the blank has been rolled, the formation of a naturally oxidized film on the surface of the base metal can be prevented to thereby obtain a superior conductivity improvement effect, and a fuel cell using the separators so manufactured can exhibit a superior power generating voltage.

As has been described heretofore, according to the present invention, by using the unique wet-blasting process in which the passivation treatment liquid mixed with abrasives is blasted to the separator, the surface rolling-affected layers of the separator can be ground to be removed to thereby allow conductive inclusions to be exposed by the abrasives 50 blasted, and at the same time as this occurs, the passivation treatment can be applied to newly produced surfaces of the separator which result from the grinding through blasting the passivation treatment liquid to the separator.

What is claimed is:

1. A method for manufacturing a fuel cell metallic separator comprising:

providing a metallic plate;

press-forming the metallic plate to form alternatively ridges and grooves in a cross section, the ridges and grooves being ridged portions and grooved portions of the metallic plate; and removing only a part of each of the ridged portions of the metallic plate, formed by the press-forming, so that each of the ridged portions of the metallic plate has a flattened surface thus producing a fuel cell metallic separator.

2. The method for manufacturing a fuel cell metallic separator as set forth in claim 1, wherein a removed amount of the surfaces of the ridged portions is 3 µm or larger.

3. The method for manufacturing a fuel cell metallic separator according to claim 1, wherein removing only a part of each of the ridged portions comprises electrolytic etching.

4. The method for manufacturing a fuel cell metallic separator according to claim 1, wherein removing only a part of each of the ridged portions comprises chemical etching.

5. The method for manufacturing a fuel cell metallic separator according to claim 1, wherein removing only a part of each of the ridged portions comprises cutting.

6. The method for manufacturing a fuel cell metallic separator according to claim 1, wherein removing only a part of each of the ridged portions comprises sandblasting.

* * * * *